United States Patent
Klemkowski, Jr.

[15] 3,678,610
[45] July 25, 1972

[54] MARINER'S LOOM

[72] Inventor: Philip J. Klemkowski, Jr., 1146 Hull St., Baltimore, Md. 21212

[22] Filed: July 20, 1970

[21] Appl. No.: 56,332

[52] U.S. Cl. .............................. 43/43.12, 43/4, 43/42.72
[51] Int. Cl. ..................................................... A01k 91/00
[58] Field of Search .............. 43/43.12, 43.15, 42.72, 42.74, 43/44.88, 42.7, 42.04, 4, 27.4

[56] References Cited

UNITED STATES PATENTS

| | | | |
|---|---|---|---|
| 2,605,568 | 8/1952 | Riley | 43/4 |
| 2,605,570 | 8/1952 | Abrey | 43/4 X |
| 3,462,870 | 8/1969 | Terilli | 43/4 |
| 2,157,003 | 5/1939 | Mussina | 43/42.74 |
| 2,749,648 | 6/1956 | Schneider | 43/43.12 |
| 3,077,048 | 2/1963 | Strumpf | 43/43.12 |
| 3,357,126 | 12/1967 | Klieves | 43/43.12 |

Primary Examiner—Samuel Koren
Assistant Examiner—James H. Czerwonky

[57] ABSTRACT

A device for giving a spots fisherman an improved control over his fishing line, the device controlling the dead fall effect when a bait is pulled from a stationary pin on an outrigger pole. The device comprises a main body having a longitudinally extending Z-shaped compartment or groove along one side thereof, the groove having one end of a slideable pin retained therein. The main body is fitted with a U-shaped clip having flexible, resilient tongues to close the opposite ends of the Z-shaped groove. Upon excessive breach pressure against the tongue at either end of the clip, the pin, which has an opening through which the fishing line passes, will breach outwardly of the device.

3 Claims, 4 Drawing Figures

Patented July 25, 1972  3,678,610

INVENTOR.
Philip J. Klemkowski Jr.

MARINER'S LOOM

This invention relates generally to fishing gear for anglers.

A principle object of the present invention is to provide a mariner's loom for controlling the dead fall effect when a bait is pulled from the stationary pin on an outrigger pole.

Another object of the present invention is to provide a mariner's loom which permits a fisherman to entice his fish to take his bait by reeling in line or paying it out whenever he so chooses.

Still another object of the present invention is to provide a mariner's loom incorporating means whereby the line pays out so to allow the bait to sink in front of the fish's eyes, thus making it easy to swallow.

Other objects of the present invention are to provide a mariner's loom which is simple in design, inexpensive to manufacture, rugged in construction, easy to use and efficient in operation.

Figure 1:
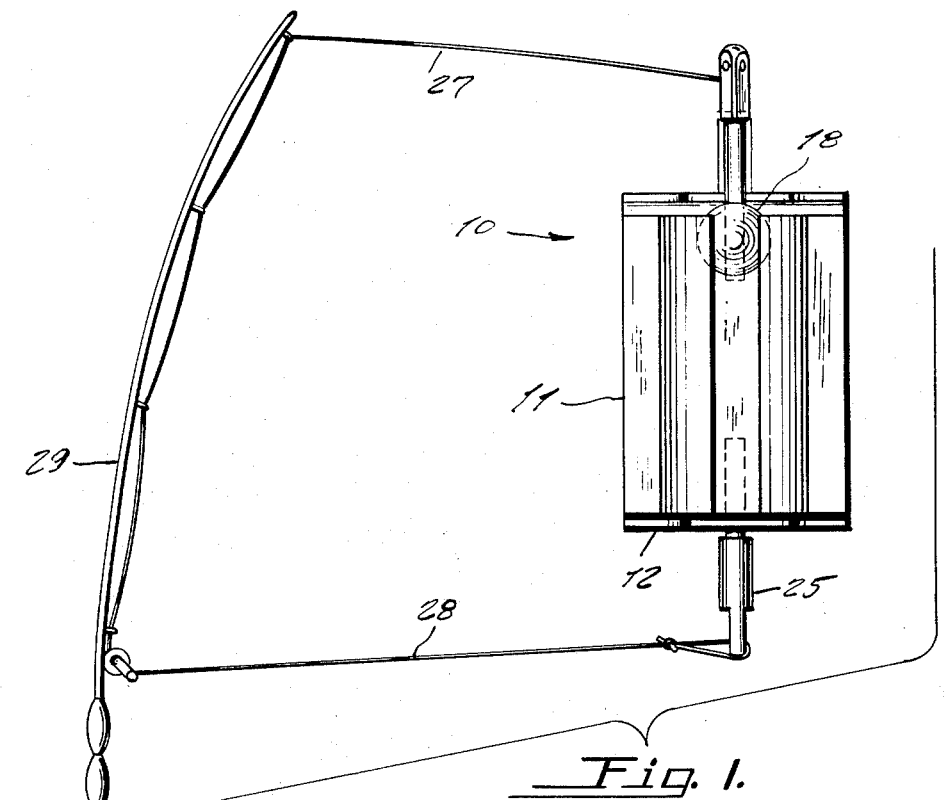
Figures 2, 3:
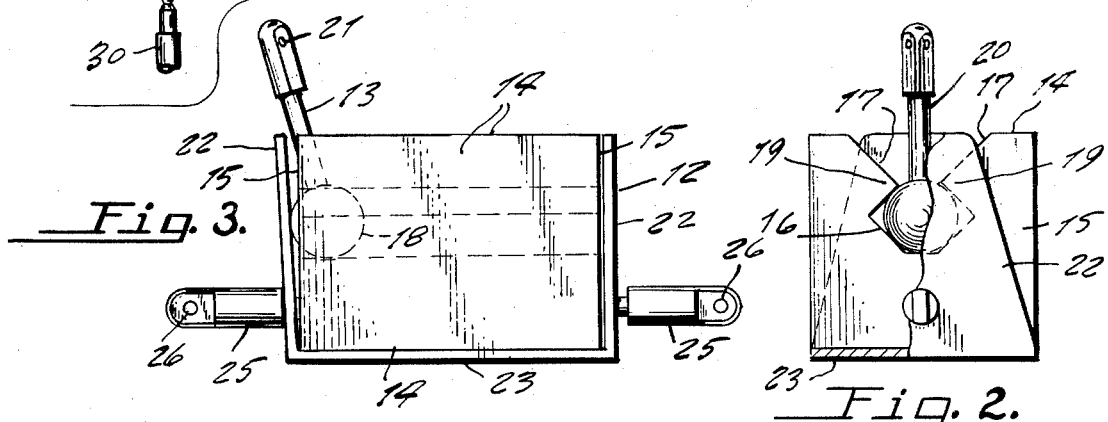
Figure 4:
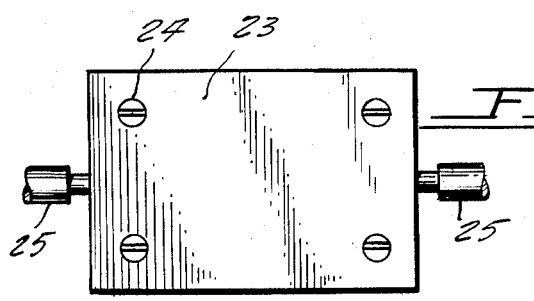

These and other objects will be readily evident upon a study of the following specification and the accompanying drawing wherein:

FIG. 1 is a top plan view of the present invention shown attached to the outrigger pole, FIG. 2 is a fragmentary and elevation view thereof, FIG. 3 is a side elevation view thereof, and FIG. 4 is a bottom plan view thereof shown fragmentarily.

Referring now to the drawing in detail, the reference numeral 10 represents a mariner's loom according to the present invention wherein there is a main body member 11 fitted within a clip 12, and the main body member normally supporting a pin 13.

The main body member 11 comprises a solid block of generally rectangular configuration, the block including four side walls 14 and two opposite end walls 15. One of the longitudinally extending side walls 14 is provided with a Z-configurated groove 16 which extends along the entire length of the block, the Z-configurated groove having angularly inclined faces 17 between the groove and the side wall 14, as shown best in FIG. 2.

The inclined surfaces or faces 17 are positioned at approximately 90° respective to each other, each being approximately 45° respective to the side wall 14.

The pin 13 comprises a member including a spherical ball 18 which fits within the Z-configurated groove and is retained therewithin due to the longitudinally extending projections 19 on the longitudinally extending sides of the groove 16.

A straight shank 20 is secured at one end to the spherical ball 18, the opposite end of the shank being enlarged as shown and being provided with a transverse opening 21 therethrough.

The clip 12 comprises a generally shaped member made of flexibly resilient material such as spring steel or the like, the clip 12 including parallel opposite tongues 22 which are interconnected by a connecting wall 23.

The main body member 11 is positioned within the clip 12 and is secured thereto by means of a plurality of screws 24 extending through the connecting wall 23 of the clips and being threadingly engaged within the bottom wall 14 of the main body member and which is located opposite the wall 14 having the longitudinal Z-configurated groove.

It is to be noted that oppositely positioned pins 25 are secured to the opposite end walls 15 of the main body member, each of the pins 25 accordingly being inserted through an opening provided in each of the tongues 22 of the clip, Each of the pins 25 is provided with a transverse opening 26.

One of the pins 25 is attached to a line 27 and the other pin 25 is attached to a line 28 which extends to an outrigger pole 29 which at its base 30 is attached to a boat.

In operative use, the pin 13 rides snugly in the Z-configurated groove, until it is pulled to the very bottom of the groove, then against the tongue 22 of the clip and sprung outwardly of the groove once the breach pressure is attained.

In one size of mariner's loom, the breach pressure may be 3 pounds stress. By inserting thicker side clips, more pull stress is needed so to breach the pin 13 which thus flexes the tongue so to breach the groove. A thicker tongue clip may breach at 6 pounds pressure and may accordingly be used to troll entire bait fish for the largest size game fish.

The Z-configurated groove diagonal faces 17 come into play when the bait pulls from the rolling of the boat, and the wave action gives a false pressure. Instead of pulling free as in the case of a stationary pin, the Z-configurated groove absorbs the initial tug pull pressure along its length. Thus instead of pulling free and falling outwards, the pin 13 need not be replaced back up on the outrigger by the angler.

Thus there is provided a mariner's loom having advantages.

Another advantage of the loom is that the angler can adjust his bait even when placed in the rigger and positioned at the top of the pole 29, such as when trolling in the boat stern wake, the angler releases the fishing line (not shown), which passes through opening 21, to the bait and extends the bait even though the outrigger is set to catch fish. The bait should be even in the boat wake so that it is easier to be watched by the angler.

Thus the mariner's loom gives the angler a new control over his line that heretofore was not possible by the older methods of line releases which were used.

What I now claim is:

1. In a device for giving a sports fisherman an improved control over his fishing line, the combination of a main body member, a clip and a pin, said main body member being fitted into said clip, said main body member comprising a longitudinally extending block of rectangular configuration, said block including four side walls and two opposite end walls, one of said side walls having a Z-configurated groove extending along the entire length of said block, said Z-configurated groove being provided with faces diagonally inclined respective to said one side wall, said diagonally extending faces thus providing an outwardly flaring entrance to said Z-configurated groove, said pin being slidably supported in said groove, said clip comprising a generally U-shaped member made of flexible resilient material, said clip comprising a pair of parallel, oppositely positioned tongues and an interconnecting wall between one end of each of said tongues.

2. The combination as set forth in claim 1, wherein each one of said tongues is positioned adjacent one of said end walls of said main body member so to normally close the ends of said Z-configurated groove.

3. The combination as set forth in claim 2, wherein said pin includes a spherical ball positioned within said Z-configurated groove and a stem extending therefrom.

* * * * *